Oct. 21, 1969 K. H. STUTZ ET AL 3,473,454
PHOTOGRAPHIC CAMERA USING MULTIPLE FLASHLAMP UNITS
Filed Dec. 27, 1966 3 Sheets-Sheet 1
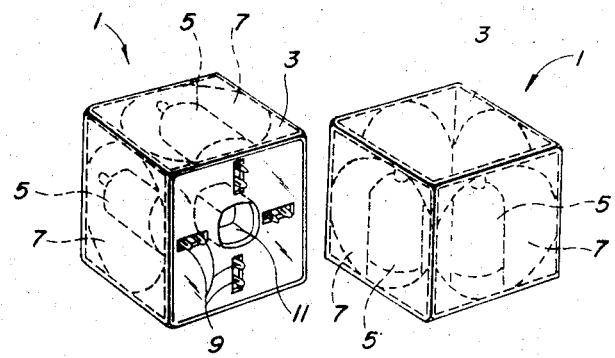
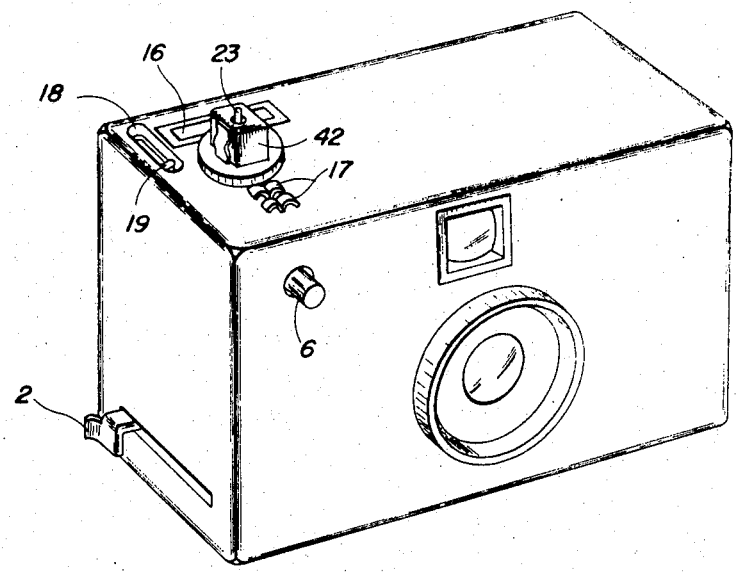
WOLFGANG M. EYSELEE
KLAUS H. STUTZ
INVENTORS
BY Robert W. Hampton
Ronald S. Carolan
ATTORNEYS

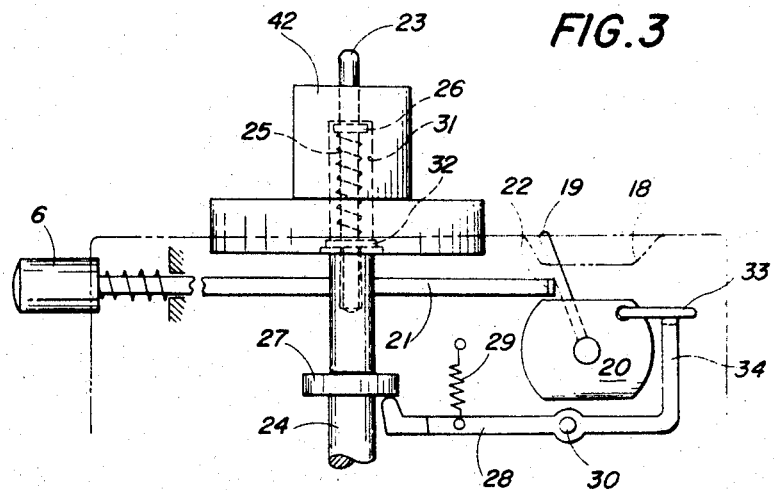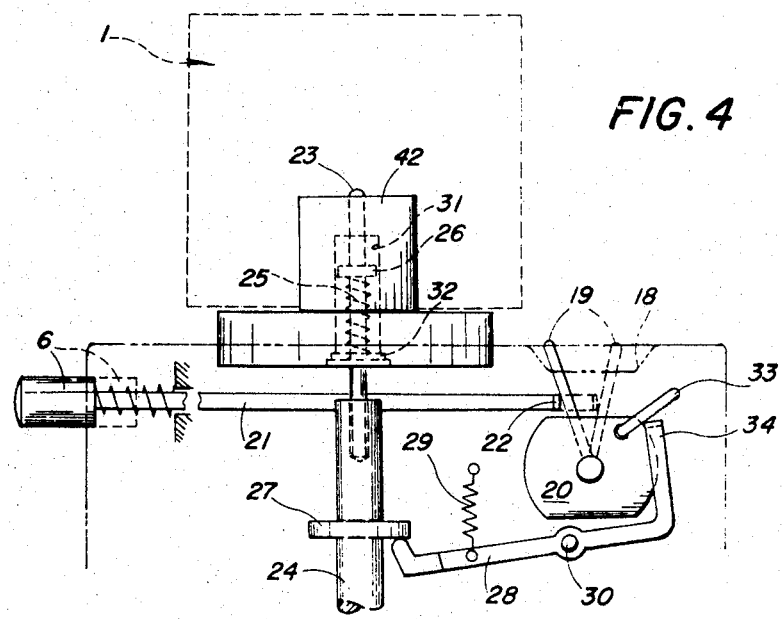

WOLFGANG M. EYSELEE
KLAUS H. STUTZ
INVENTORS

United States Patent Office 3,473,454
Patented Oct. 21, 1969

3,473,454
PHOTOGRAPHIC CAMERA USING MULTIPLE
FLASHLAMP UNITS
Klaus H. Stutz, Herlikofer, Hussenhofen, and Wolfgang
M. Eyselee, Esslingen, Germany, assignors to Eastman
Kodak Company, Rochester, N.Y., a corporation of
New Jersey
Filed Dec. 27, 1966, Ser. No. 605,024
Claims priority, application Germany, Jan. 4, 1966,
E 30,781
Int. Cl. G03b 15/035, 17/20
U.S. Cl. 95—11                                    6 Claims

ABSTRACT OF THE DISCLOSURE

A signal device for a multilamp flash camera which automatically indicates the presence and number of unused lamps after each camera operation and which is reset when a fresh flashlamp unit it attached. The signal device has a counter mechanism having indicia thereon, a lever member for resetting the counter mechanism, and an actuating element for actuating the signal device in response to operation of the shutter-trigger of the camera.

---

The present invention relates to flash photography, and more particularly, to photographic cameras having flash systems using multilamp photoflash units.

There has recently been developed a multilamp photoflash unit and a camera mechanism for receiving and indexing the unit, see for example U.S. Patent No. 3,319,-547, issued to George W. Parsons et al. on May 16, 1967.

In U.S. Patent No. 3,391,621, issued to H. Nerwin on July 9, 1968, there is disclosed an indicating mechanism responsive to the turning of such a multilamp unit to indicate in a camera viewfinder the number of flashes which have been used or unused. Also disclosed therein are mechanisms which block the shutter or the film advance when all flashlamps have been used.

It is an object of this invention to provide a mechanism indicating to the photographer the condition of use of a multilamp unit which mechanism does not derive its energy for operation directly off rotation of the flashlamp unit.

This and other objects are obtained in accordance with the invention by providing a counter which is actuatable directly off movement of the shutter-trigger of the camera without being dependent upon a transfer of force through the multilamp unit. The counter is made sensitive to the condition of use of the multilamp unit by a mechanism which resets the counter upon insertion of the unit, and the counter in turn is coupled to an indicating mechanism signaling to the photographer the condition of use of the multilamp unit. This mechanism has the advantage of obtaining its energy for operation directly from the shutter-trigger, where substantial energy is available, rather than utilizing energy transferred through indexing of the multilamp unit. Such an indicating mechanism provides the appropriate signal immediately upon exposure rather than later as is the case in cameras in which the indicating mechanism is actuated only upon advance of the film.

In a preferred embodiment of the invention, a blocking mechanism prevents actuation of the indicating mechanism when a multilamp unit is not attached. With the same mechanism the multilamp unit can be removed with less than all lamps used, pictures taken without a flash, and the multilamp unit replaced in the camera without disturbing the setting of the indicating mechanism.

These and other objects and advantages of the invention will be apparent from the following description of preferred embodiments thereof, reference being made to the accompanying drawing in which:

FIGS. 1A and 1B show two different perspective views of a flashlamp unit;

FIG. 2 is a perspective schematic view of a photographic camera embodying the present invention, without a flashlamp unit attached;

FIG. 3 is a schematic lateral view showing parts of the flashlamp unit receiving device incorporated in a photographic camera according to the invention, without a flashlamp unit attached;

FIG. 4 is a view corresponding to FIG. 3 but with an attached flashlamp unit;

FIG. 5 is a plan view of an embodiment of the indicating scale of the signal means in the photographic camera according to the invention.

Figure 6:
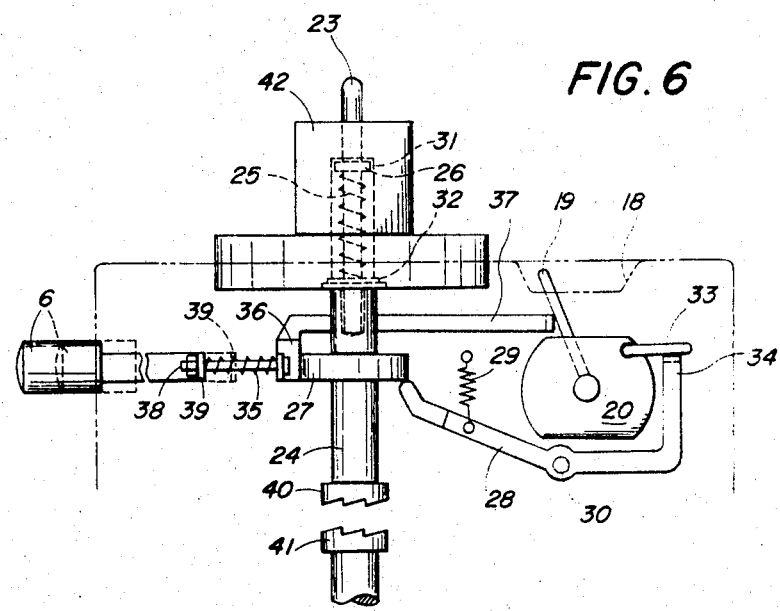
FIGS. 6 and 7 are views corresponding to FIGS. 3 and 4, respectively, showing a second modified embodiment of the invention.

As illustrated in FIG. 1, a flashlamp unit 1 suitable for use with a photographic camera according to the invention comprises a transparent or light-transmitting protective cover 3 of cubic shape containing four photoflash lamps 5 which are mounted in a vertical position about a common axis of rotation. As disk-shaped reflector 7 is provided behind each photoflash lamp 5 to control the direction of its light emission outwardly on an axis perpendicular to the corresponding side of the protective cover 3. Each of the employed photoflash lamps 5 is of the all glass (AG) variety and includes a pair of lead-in wires 9 extending down through the base portion of the protective cover 3. As also shown in FIG. 1, the base portion defines a central, substantially square socket opening by means of which the flashlamp unit 1 may be attached to a rotatable support 42 shown, for example, in FIG. 2. A photographic camera embodying the present invention is shown in FIG. 2 and includes the usual structural elements such as lens, diaphragm, shutter etc. These parts are, however, not individually depicted or designated, since they are of no significance to the present invention and may be of any form known in the art.

The photographic camera is also provided, in the usual manner, with a film advancing lever 2 serving to advance the film after each exposure and to wind the film onto a take-up spool. The successive functions necessary to make an exposure are controlled by a camera actuating or release member 6 which, when depressed, operates the shutter in a manner known per se.

Passing through the top of the camera housing is a portion of the rotatable support 42 to which a flashlamp unit 1 is attached. In addition, two flash circuit terminals 17 are positioned in the camera top surface to engage the lead-in wires 9 of the particular photoflash lamp 5 which is positioned at the front of the photographic camera. The remainder of the flash circuit, which electrically ignites the photoflash lamp 5 upon actuation of the release member, is not shown and may be of any suitable construction or arrangement. The top of the camera housing is also provided with an indicator window 16 through which the photographer can observe a signal means informing him of the presence or absence, and the number of, good photoflash lamps 5 in the flashlamp unit attached to support 42. In addition, the top of the camera housing is provided with an elongated recess 18 through which extends a lever 19 that can be manually operated by the photographer.

As shown in FIGS. 3 and 4, lever 19 is coupled with a counting mechanism which serves as signal means. The counting mechanism 20 is advanced upon actuation of lever 19. A connecting link provided between release member 6 and lever 19 serves to move lever 19 upon each actuation of the release mechanism, thus advancing the counting mechanism 20. In the embodiment illustrated in FIGS. 3 and 4, the connecting link is a push rod 21 which is rigidly connected to the camera release member 6, its bent portion 22 being moved into abutting engagement with the lever 19 when release member 6 is actuated. The mechanism by way of which the release member 6 controls camera shutter operation is not illustrated but may be of any known construction.

The rotatable support 42, rotatably supported by the camera housing, is driven by a spindle 24 which is operatively connected to the film advancing mechanism of the photographic camera such that it is rotated 90° upon each operating cycle of the film advancing lever 2 effected to advance the next film frame for exposure. A suitable operative connection is shown in the aforementioned patent application.

The spindle 24 is rotatably connected to support 42 by way of a sensing pin 23 whose diameter is smaller than that of spindle 24. The sensing pin 23 is provided with a non-circular engaging portion 26 which is either formed integral with the sensing pin 23 or is fastened to it in a suitable manner. The engaging portion 26, though slidably disposed in a suitable recess 31, transmits by its non-circular shape the rotary motions of the sensing pin 23 to the support 42. The sensing pin 23 in turn is fastened to the spindle 24 by suitable means, e.g. by screw connection.

The upper end of the sensing pin 23 passes through a bore which extends upwardly from the top of the recess 31. As mentioned, the sensing pin 23 and the spindle 24 connected thereto are axially displaceable with respect to the support 42, against the tension of a helical spring 25 whose one end rests against the engaging portion 26 and whose other end rests against a spring ring 32 disposed at the lower edge defining recess 31. If no flashlamp unit 1 is attached to support 42, the sensing pin 23 and the spindle 24 assume the axial position shown in FIG. 3. If, however, a flashlamp unit is attached to socket 42, the physical engagement with the flashlamp unit 1 will depress the sensing pin 23, so that the sensing pin 23 and the spindle 24 assume the axial position shown in FIG. 4.

The spindle 24 is provided with a collar 27 which is either formed integral or rigidly connected therewith. The collar 27 defines a stop for an angle lever 28. The angle lever 28 is pivoted on a shaft 30 which is rigidly supported by the camera housing. As illustrated in FIGS. 3 and 4, a spring 29 urges the left end of angle lever 28 against collar 27. The right end 34 of the angle lever 28 in FIGS. 3 and 4 abuts against a resetting member 33 of counting mechanism 20 which operatively engages the end 34. When a flashlamp unit 1 is attached to support 42, thus causing the sensing pin 23 and the spindle 24 to be pushed downward, the resetting member 33 is moved upwards. Each upward motion of the resetting member 33 resets the counting mechanism 20 to an initial position.

FIG. 5 shows an example of an inscription with which the signal scale of the counting mechanism 20 may be provided, if, as in the case of the present embodiment, a flashlamp unit 1 containing four photoflash lamps 5 is employed. Depending on the particular position of the counting mechanism scale, one of the five scale sections shown in FIG. 5 is visible in the indicator window 16. When a fresh flashlamp unit is attached to support 42, the counting mechanism 20 of the embodiment illustrated in FIGS. 3 and 4 is reset, by the upward motion of resetting member 33, into the initial position in which the scale section "FOUR LAMPS" is visible in the indicator window 16. Upon each following exposure made by depressing the release member 6, the counting mechanism 20 is advanced by movement of the lever 19, so that, after the first exposure, the signal "THREE LAMPS" appears in the indicator window 16. The photographer is informed that he still has a supply of three good photoflash lamps 5 in the attached flashlamp unit 1. The counting mechanism is advanced each time a further exposure is made. When all the photoflash lamps in the flashlamp unit are fired, the signal "CHANGE LAMPS" appears in the indicator window. When the photographer now attaches a fresh flashlamp unit, after he has removed the spent flashlamp unit 1, the counting mechanism is reset in the manner described above, so that the signal "FOUR LAMPS" is again visible.

The embodiment described above can be modified by using a counting mechanism 20 which is designed such that the lever 19 can no longer make an advance motion when the signal "CHANGE LAMPS" is visible in window 16, but is released for an advance motion only when the resetting member 33 has been actuated. In a camera according to this embodiment, the camera release member 6 will be locked, if the photographer has overlooked the signal "CHANGE LAMPS" and tries to make further exposures without having replaced the spent flashlamp unit 1 by fresh one. In such an embodiment, it would be useful to provide means for disengaging the rigid connection between push rod 21 and camera release member 6 to enable the photographer, after he has carried out a certain setting operation, to make optional daylight exposures even though the spent flashlamp unit 1 is still attached to support 42.

Figure 7:
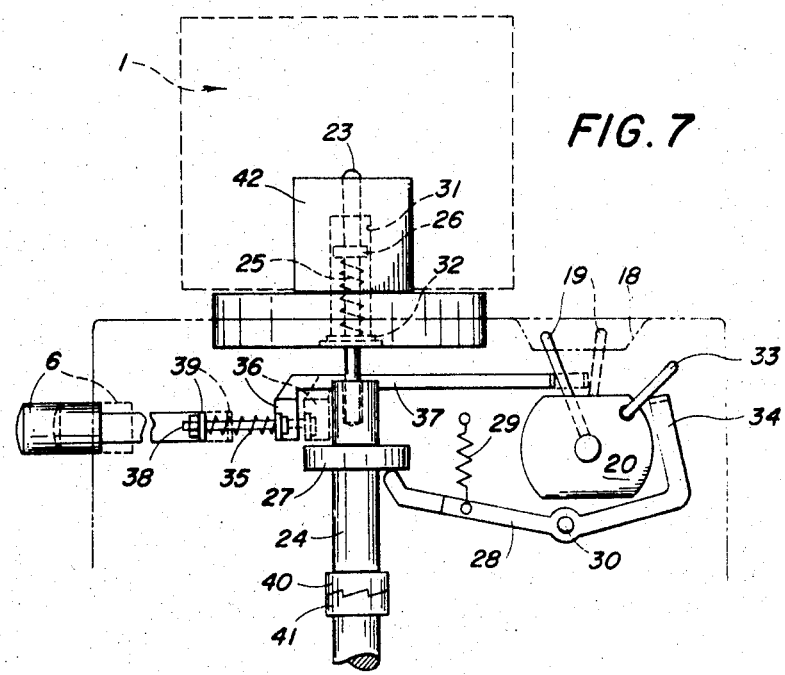

FIGS. 6 and 7 show a modified embodiment in which lever 19 of the counting mechanism 20 is not rigidly connected to camera release member 6 by a push rod. Instead, lever 19 is functionally connected to the camera release member 6 by a spring 35 which acts at one end on the camera release member 6 and at the other end on bent portion 36 of an angular push rod 37. When the spindle 24 and the sensing pin 23 are in normal position, i.e. when no flashlamp unit is attached as in FIG. 6, the collar 27 of spindle 24 defines a stop for the bent portion 36 of push rod 37. When no flashlamp unit 1 is attached, the counting mechanism 20 cannot be advanced upon actuation of release member 6. However, a pin 38 which centers the spring 35 is fastened to the bent portion 36 of push rod 37 and freely extends through a bore at the end 39 of camera release member 6. Thus, when the push rod 37 is blocked, the camera release member 6 can be actuated relative to pin 38 against the bias of spring 35. In the embodiment illustrated in FIGS. 6 and 7, the spindle 24 is not directly connected to the film advancing mechanism of the photographic camera, but by a clutch formed by the clutch components 40, 41. The clutch is engaged only when a flashlamp unit 1 is attached, i.e. when sensing pin 23 and spindle 24 are pushed downward. The embodiment shown in FIGS. 6 and 7 uses a known counting mechanism of the type that can only be reset when the signal (here: CHANGE LAMPS) corresponding to the end position is visible. In this embodiment, therefore, the signal of counting mechanism 20 remains in its position when a partly spent flashlamp unit 1 is removed from support 42 and the photographer starts to make daylight exposures. Since, upon removal of the flashlamp unit 1, the clutch components 40, 41 are disengaged, the support 42 remains in its particular rotational position when the camera is operated for making daylight exposures. Furthermore, by using such a counting mechanism 20 which can be reset only when the signal "CHANGE LAMPS" is visible, while in all other signal positions the resetting member 33 can freely move upwards without resetting the mechanism, the mechanism will continue to give correct signals when the partly spent flashlamp unit 1 is again attached. Thus, it is possible to make the signal means indicate the number of remaining good lamps when attaching a partly spent flashlamp unit. In the embodiment according to FIGS. 3 and 4 as well as in the embodiment according to FIGS. 6 and 7, the signal means can also be set to the number of remaining good lamps when a partly spent flashlamp unit is attached, in that the photographer manually operates the lever 19 until the corresponding signal appears in the indicator window.

It should be noted that support 42 in either embodiment shown in FIGS. 6 and 7 may be provided with detent means as shown in the aforementioned application which can be disengaged by rotation and which serve to fix the support 42 in selected rotational positions, the number of which corresponding to the number of photoflash lamps 5 contained in the flashlamp unit 1.

While the invention has been described in relation to preferred embodiments, it is obvious that modifications may be made without departing from the spirit of the invention or the scope of the claims.

We claim:
1. In a photographic camera having an actuatable shutter-trigger and means for receiving and indexing a multilamp photoflash unit, the improvement comprising:
a counter,
means coupled to and movable with said shutter-trigger, for actuating said counter in response to actuation of said shutter-trigger,
indicating means responsive to said counter to indicate progressive use of said multilamp unit, and
means to reset said counter in response to insertion of a multilamp unit in said receiving and indexing means.

2. The improvement according to claim 1 wherein said means for receiving and indexing a multilamp unit includes a stop member which is moved from an active to an inactive position by receipt of a multilamp unit, said stop member blocking said actuating means from actuating said counter when said stop member is in said active position, and wherein said means for actuating said counter and said shutter-trigger are coupled by a coupling means which includes resilient means for absorbing motion of said shutter-trigger when said counter actuating means is blocked from movement by said stop member.

3. The improvement according to claim 1 wherein said means for receiving and indexing includes a collar displaceable from a first to a second position by insertion of said multilamp unit and wherein said resetting means includes a lever responsive to movement of said collar from said first position to said second position to reset said counter.

4. The improvement according to claim 1 wherein said means for receiving and indexing includes means for disengaging said counter actuating means when a multilamp unit is not in said receiving and indexing means.

5. The improvement according to claim 4 wherein said counter is resetable from only one of a plurality of indicating positions.

6. The improvement according to claim 5 wherein said means for receiving and indexing is coupled to a camera setting mechanism to index said unit in response to said setting mechanism and said means for receiving and indexing further comprises clutch means to engage said indexing means and said camera setting means only when a multilamp unit is attached.

References Cited

UNITED STATES PATENTS

| | | | |
|---|---|---|---|
| 3,357,329 | 12/1967 | Nerwin | 95—11 |
| 3,380,357 | 4/1968 | Harvey | 95—11.5 |
| 3,391,621 | 7/1968 | Nerwin | 95—11 |

NORTON ANSHER, Primary Examiner

FRED L. BRAUN, Assistant Examiner

U.S. Cl. X.R.

116—114; 240—37.1